United States Patent
Bretz et al.

(10) Patent No.: US 6,300,468 B1
(45) Date of Patent: Oct. 9, 2001

(54) PROCESS FOR PRODUCING POROUS POLYMER GLOBULES

(75) Inventors: Karl-Heinz Bretz, Nienburg; Heinz-Helmer Rasche, Burgdorf; Helmut Derleth, Nienburg, all of (DE); Philippe Francois, Court-Saint-Etienne (BE)

(73) Assignee: Solvay Deutschland GmbH, Hannover (DE)

( * ) Notice: Subject to any disclaimer, the term of this patent is extended or adjusted under 35 U.S.C. 154(b) by 0 days.

(21) Appl. No.: 09/230,522
(22) PCT Filed: Jul. 18, 1997
(86) PCT No.: PCT/EP97/03860
  § 371 Date: Sep. 23, 1999
  § 102(e) Date: Sep. 23, 1999
(87) PCT Pub. No.: WO98/04618
  PCT Pub. Date: Feb. 5, 1998

(30) Foreign Application Priority Data

Jul. 27, 1996 (DE) .............................................. 196 30 451

(51) Int. Cl.$^7$ ....................................................... C08F 6/00
(52) U.S. Cl. .............................. 528/497; 526/60; 526/61; 528/490

(58) Field of Search ..................... 526/60, 61; 528/497, 528/490

(56) References Cited

U.S. PATENT DOCUMENTS 3,993,713 * 11/1976 Van Brederode et al. .......... 260/878
5,314,923 *  5/1994 Cook et al. ............................ 521/64

OTHER PUBLICATIONS

Handbook of Polyolefins, Synthesis and Properties, Marcel Dekker, Inc. (p. 570), 1993.*

* cited by examiner

Primary Examiner—Donald R. Wilson
Assistant Examiner—William Cheung
(74) Attorney, Agent, or Firm—Crowell & Moring LLP

(57) ABSTRACT

A process for producing porous polymer beads in which polymers, preferably polyolefins or polyvinyl chloride, are dissolved in a solvent, preferably halogenated hydrocarbons or alkyl esters, at temperatures close to the boiling point of the solvent. The hot polymer solution is cooled, and the polymer beads formed during the cooling process are separated, washed and dried. The porous polymer beads are useful, for example, as catalyst carriers or as adsorption agents.

13 Claims, No Drawings

PROCESS FOR PRODUCING POROUS POLYMER GLOBULES

BACKGROUND OF THE INVENTION

The present invention relates to a method for producing porous, spherical particles in the non-nanoscalar range of polymeric material.

Spherical particles are used, for example, on a large scale as catalysts, catalyst supports, adsorbents, drying agents or ion exchangers.

For most of the applications named, particles are required with a uniform spherical shape and a narrow spectrum of particle sizes, in order to make a more uniform packing and a high packing density, for example, in a solid bed reactor, possible. If the particles are used in a moving bed reactor, they are expected to have a higher abrasion resistance.

If the particles are to be used as catalysts or catalyst supports, they must have, in addition to a narrow particle size spectrum, a certain surface area and a specific pore volume.

The spherical particles composed of inorganic oxides are obtained, for example, by the generally known sol-gel method, in which, to begin with, a sol is produced in the form of a solution, suspension or dispersion. Subsequently, the sol is converted into droplet particles, which are thereupon caused to gel. During this process, the droplets assume a spherical conformation and solidify in a suitable gaseous or liquid medium. After a wet process, the product is dried and tempered. The finished product consists of spherical, porous, oxide particles.

On the other hand, polymer dispersions are tiny polymer globules, which are dispersed uniformly in a liquid medium. Approximately, 30% of all synthetic resins based on styrene, butadiene, acrylic acid derivatives or vinyl esters are produced and processed at the present time in the form of dispersions.

For emulsion polymerization, monomers, to begin with, are dissolved in water or emulsified in the form of very fine droplets with addition of surfactants. After the polymerization reaction is started, during which monomers join together to form long-chain molecules, the droplets grow at the expense of the dissolved monomer and finally cure with cross linking into small spherical, non-porous particles, 50 to 1,000 nm in diameter (depending on the surfactant content).

It is furthermore known that porous, non-nanoscalar polymer beads can be produced by suspension polymerization in the presence of inert components, which can later on be removed from the polymer.

The polymerization of the monomers is carried out here under such conditions, that the inert components are finely dispersed in the polymer particles formed during the polymerization.

In a subsequent step of the process, the inert components are removed by evaporation, extraction or some other way, which maintains the desired porosity in the polymer particles.

This method is suitable, however, only for polymers, the chains of which form a rigid, coherent lattice structure, such as cross-linked aromatic polymers (German patent 3,202, 479).

Moreover, porous particles, composed of polyvinyl chloride, can be produced by atomizing polymer solutions in a heated stream of gas and, at the same time, evaporating the solvent. The choice of solvent is important here, since any molecular weight change is to be avoided and, in any case, no solvent residues may remain in the polymer.

SUMMARY OF THE INVENTION

It was an object of the invention to provide a modified process for the production of porous polymer beads ranging from 1 to 1,000 micrometers in diameter.

Pursuant to the invention, polymers that are not cross linked, that is, linear polymers, especially polyolefins or PVC, are dissolved in a solvent at an elevated temperature and subsequently cooled to room temperature. When selecting the solvent, it is important to choose a solvent, in which the polymers used have a high solubility at elevated temperatures and a low solubility at low temperatures, so that, as the temperature drops, the polymers precipitate once again. It is a further criterion for the selection of the solvent that the polymer forms true or colloidal solutions with the solvent.

It was found, for example, that polymers not only dissolve in halogenated aromatic hydrocarbons, alkyl esters or phenyl ethers, but also separate once again when the polymer solution cools down, so that, in an unexpected manner, porous polymer beads are formed.

DESCRIPTION OF PREFERRED EMBODIMENTS

In one embodiment of the invention, dichlorobenzene is used as halogenated hydrocarbon for dissolving the polymers. Ortho-, meta- as well as para-dichlorobenzenes or their mixtures are suitable. Preferably, 1,2-dichlorobenzene is used.

In a further embodiment, amyl acetate is used as alkyl ester or anisole is used as phenyl ether for dissolving the polymer.

The polymers are dissolved at temperatures close to the boiling points of the solvents used, such as 100 to 180° C. and preferably 140 to 180° C. The use of pressure is also possible.

As uncrosslinked, linear polymers, which may also be branched, polyolefins, preferably polypropylene, polyethylene or polyvinyl chloride are used.

In a preferred embodiment, polypropylene is used.

The polymer solution can be cooled quickly or slowly.

In one embodiment of the invention, the solution is cooled at the rate of 1 to 3° C. per minute.

It is also within the scope of the invention to age the polymer solution by lowering the temperature to a value between 60 and 90° C. over a period of 0 to 24 hours. Preferably the aging takes place over a period of 1 to 3 hours, during which the temperature is lowered to a value between 60 and 80° C. After the aging, the solution is cooled further to room temperature.

The size of the polymer beads is affected by the way in which the polymer solution is cooled.

The size of the polymer beads is also affected by varying the cooling time and the aging temperature, respectively.

If, for example, the aging time is 1 to 2 hours and the aging temperature is 70° C., polymer beads with an average diameter of 110 to 120 $\mu$m can be obtained. The aging temperature usually is between 60 and 100° C. It was noted that, as the aging temperature decreases, the diameter of the beads increases.

For example, microspheres with an average diameter of less than 100 $\mu$m are obtained if aging is omitted.

The total solids content of the polymer in the solution is a further factor that influences the polymer bead size. Accordingly, a total solids content of 20% has proven to be advantageous for optimum bead formation. A total solids content of less than 20% leads to the formation of distinctly smaller spheres.

If the hot polymer solution is sprayed, atomized or divided into droplets in a cooling medium in a known manner for cooling, mesobeads or macrobeads are obtained with an average diameter of 100 to 200 $\mu$m and 1,000 to 5,000 $\mu$m, respectively.

The resulting polymer beads are separated, washed in a solvent, in which the solvents, used to dissolve the starting polymer, are soluble, and subsequently dried. The solvent, used to wash the polymer beads, should not form an azeotropic mixture with the solvents used to dissolve the polymers.

Preferably, alcohol is used for the washing.

If 1,2-dichlorobenzene is used as solvent, preferably isopropanol is used for the washing, since isopropanol does not form an azeotropic mixture with 1,2-dichlorobenzene, so that separation by distillation is readily possible.

If amyl acetate is used as solvent for the polymer, the polymer beads can also be washed with isopropanol.

It is also within the scope of the invention to cool the hot polymer solution by introducing it in a known manner, such as spraying or dividing it into droplets, into a cooling medium, such as cold or liquid air, solid carbon dioxide or liquid nitrogen.

It has proven to be advantageous to wash the beads several times in order to make certain that the solvent is removed completely.

Pursuant to the invention, it is possible to produce not only porous polymer beads from the pure polymers. It is also possible to use physical or chemical mixtures of polypropylene, polyethylene or polyvinyl chloride as starting material.

In order to influence the physical and functional properties of the polymer beads, known additives can be incorporated in a known manner into the polymer. For example, the additives can be admixed with the polymer solution in dissolved or solid form.

It is also within the scope of the invention to influence the properties of the porous polymer beads by coating or impregnating them with known additives.

For example, additives with functional groups, complexing agents, surfactants, porosity-affecting agents, inorganic oxides or china clay can be used as additives.

In one embodiment of the invention, titanium tetrachloride, titanium trichloride or magnesium chloride was used as an additive for influencing the physical properties of the polymer beads.

The porous polymer beads, produced pursuant to the invention, are distinguished from previously known polymer beads, for example, by a narrow spectrum of particle sizes and by a very uniform spherical shape.

In a preferred embodiment, polypropylene beads, the average diameter of which is 10 to 50 $\mu$m or 1,500 $\mu$m, are produced. In a different preferred embodiment, polymer beads with an average diameter of 500 to 1,000 $\mu$m are produced.

These polymer beads have an advantageous pore volume, as well as an advantageous distribution of the pore volume. The pore volume amounts to 0.1 cm$^3$/g to 3 cm$^3$/g, preferably to 0.2 cm$^3$/g to 2 cm$^3$/g and particularly to 0.3 cm$^3$/g to 1.5 cm$^3$/g. The distribution of the pore volume is such that at least 90% of the pores have a diameter smaller than 10 $\mu$m. Preferably, 90% of the pores have a diameter smaller than 5 $\mu$m and, in particular, a diameter smaller than 1 $\mu$m.

In a preferred embodiment, polypropylene particles, at least 90% of the pores of which have a diameter not exceeding 0.1 $\mu$m and which have a pore volume of 0.3 cm$^3$/g to 1 cm$^3$/g, are produced.

Due to their properties, they can be used not only as adsorbents but also as catalyst supports.

The porous polymer beads, produced pursuant to the invention, can be used, for example, as a support material for Ziegler-Natta catalysts, which are used for the polymerization of olefins.

As catalytically active compound, these known catalysts contain at least one metal or one metal compound of the third, fourth or sixth subsidiary group of the periodic table of elements.

This catalytic compound may be a metallocene compound of the aforementioned metals, or a compound, which contains at least titanium, magnesium and chlorine or an organic titanium trichloride complex with organic electron donor compounds, which have free electron pairs.

These compounds are known and belong to the state of the art.

The support catalysts are produced in a known manner by impregnating or steeping the polymer beads with the catalytic compound, the compound being fixed in or on the support.

Metallocene compounds are understood to be compounds, which contain at least one neutral metallocene, the metal being combined with at least one halogen atom and containing at least one ionizing material. Examples of neutral metallocenes, of ionizing materials as well as methods for synthesizing these catalysts are disclosed in U.S. Pat. No. 5,496,782.

Compounds, which contain titanium, magnesium and chlorine, are understood to be those, which are disclosed in U.S. Pat. No. 5,556,893. Particularly suitable compounds are those which contain magnesium chloride or titanium chloride.

Organic titanium trichloride complexes are understood to be compounds, which are obtained in accordance with U.S. Pat. No. 5,206,198 by reacting TiCl$_4$ with a compound of the general formula I

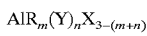

in which

R is a hydrocarbon group, such as an alkyl group,

Y is OR', SR', NR'R", in which R' and R" represent a hydrocarbon group, such as alkyl, or hydrogen x represents halogen and n is 0 to 3, preferably 0 to 0.5, especially smaller than 0.45 and preferably smaller than or equal to 0.4 and m is 0 to 3 and preferably 1 to 2.

The sum of m +n is less than or equal to 3.

The porous polypropylene beads, produced pursuant to the invention, are preferably used as support material for the production of supported catalysts.

These supported catalysts are suitable for the homopolymerization and/or copolymerization of olefins with 2 to 20 carbon atoms, such as ethylene, propylene, 1-butene, 4-methylpentene, 3-methylbutene.

The conditions for such polymerization reactions are known and belong to the state of the art.

The following examples are intended to explain the invention without limiting it.

EXAMPLES

Example 1
Batchwise Production of Polypropylene Beads

Polypropylene (60 kg) is dissolved in dichlorobenzene (600 kg) in a double-jacketed container, equipped with stirrer and steam heating. The dissolving temperature is 160° C. The solution is cooled to 70° C. This temperature (70° C.) is kept constant in the container for about 2 hours.

The resulting suspension is subsequently cooled to ambient temperature (25° C.). The resulting polypropylene beads are filtered out and washed with 1,800 kg isopropanol. The wash liquor, a mixture of dichlorobenzene and isopropanol, is separated into its components, dichlorobenzene and isopropanol, by distillation and can be used again. The washed polypropylene beads are dried with nitrogen and fractionated through screens.

Example 2

The procedure was analogous to that of Example 1. However, the total solids content of polypropylene was varied, as was the aging time. The dissolving temperature is 150° C. and amyl acetate is used as solvent.

By varying the cooling time from the dissolving temperature to the aging temperature within the range of 40 minutes to 3 hours, it was noted that shorter cooling times resulted in small beads and that a prolongation of the cooling time promoted an increase in the diameter of the beads.

It was furthermore noted that, as the aging temperature decreased, the formation of beads with a larger diameter is also favored.

The aging time does not have a significant effect on the size of the polymer beads.

Example 3
Experimental Procedure Analogous to that of Example 1
  Solvent: anisole
  Dissolving temperature: 120° C.
  At total solids contents of 5 to 10%, beads with a relatively small diameter were obtained.

Examples 4–6

Polypropylene was dissolved at 160° C. in dichlorobenzene and formed into droplets in a known manner in a cold medium. Cold air, solid carbon dioxide and liquid nitrogen were used as cold medium.

The polymer beads formed were separated, washed with isopropanol, dried and fractionated by screening.

Dichlorobenzene and isopropanol were recovered by distillation from the wash liquor.

Table 1 shows the results of the batchwise production of the polymer beads.

Results, which were obtained by spraying the polymer solution in air, are listed in Table 2.

TABLE 1

| Polypropylene Total Solids Content % by weight | Solvent | Aging | Pore Volume ml/g | Particle Size Distribution in Micrometers Maximum at |
|---|---|---|---|---|
| 10 | dichlorobenzene | none | 0.69 | 80 |
| 10 | dichlorobenzene | 3 hours | 0.58 | 160 |
| 20 | amyl acetate | none | 0.61 | 73 |

TABLE 2

Spraying the Polymer Solution at Room Temperature in Air

| Polypropylene Total Solids Content | Solvent | Average Particle Diameter mm |
|---|---|---|
| 10 | dichlorobenzene | 1.5 ± 0.5 |
| 20 | amyl acetate | 4 ± 1 |

Example 7
A. Preparation of the Catalyst

Polypropylene beads (25 g) with a pore volume of 0.58 ml/g, which were prepared as described in Example 2, were transferred into a 1 liter autoclave. Diisoamyl ether (23 ml, 45.2 mmoles) was added at 30° C. Titanium tetrachloride (20 ml) is introduced into this mixture during a period of 30 minutes. The temperature is maintained at 30° C.

Over a period of one hour,

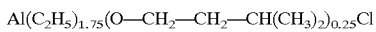

is added to this suspension.

The aluminum compound is obtained previously by mixing 6 ml of diethyl aluminum chloride (DEAC) and 1.3 ml of isoamyl alcohol and 27 ml of hexane.

Over a period of one hour, the temperature is increased to 100° C. and held there for two hours. Subsequently, the temperature is reduced to 20° C.

The solid catalyst is separated, washed with hexane and dried in a stream of nitrogen. The catalyst contains 78 g of Ti and 167 g of Cl per kg of catalyst (determined by elemental analysis).

B. Polymerization of Propylene
  Under an atmosphere of nitrogen
  400 mg of DEAC, dissolved in hexane
  60 mg of $TiCl_3$
  hydrogen with a partial pressure of about 1 bar
  3 liters of liquid propylene
are introduced into a 5 liter autoclave.

The concentration of the DEAC/hexane solution was selected so that 80 g of DEAC were dissolved in 1 liter of hexane.

The molar ratio of DEAC to $TiCl_3$ in the catalyst is approximately 10:1.

The mixture is stirred for 3 hours at 65° C. Excess propylene is removed by degassing.

The catalytic activity is determined indirectly by determining the residual titanium content in the polymer by X-ray fluorescence. Expressed in g of polypropylene per gram of $TiCl_3$, it amounts to 9410.

The productivity, expressed in g of polypropylene per g of catalyst, is 2364.

Polypropylene properties:
  Specific density: 383 g/liter
  Melt viscosity: 6.9 g/10 min
  (ASTM D Standard 1238)

Example 8
A. Preparation of the Catalyst

A solution (100 ml), which was obtained after 4 hours by mixing 76 g of magnesium chloride with 500 ml of titanium tetrabutylate in 400 ml of heptane at 90° C., is transferred to a 1 liter reactor, which was flushed with nitrogen. After that, 420 ml of hexane, 100 ml of silicone oil (fluid 200, viscosity 50 cSt) and 25 g of polypropylene beads of Example 7A are added.

Silicon tetrachloride (37 ml) is added to the mixture over a period of 2 hours at a temperature of 10° C. The temperature is raised to 100° C. over a period of one hour and maintained there for 2 hours.

The solid phase is removed and washed with hexane. Over a period of one hour, 375 ml of hexane and 42 ml of titanium tetrachloride are added at ambient temperature.

The temperature is raised to 100° C. over a period of one hour and maintained there for 2 hours.

After the solid phase is separated and purified, 1.1 ml of diisobutyl phthalate are added. The temperature once again is raised to 100° C. over a period of one hour and maintained there for one hour.

The solid phase is separated and washed with hexane. After that, 42 ml of titanium tetrachloride are added over a period of one hour. The temperature once again is raised to 100° C. over a period of one hour and maintained there for 2 hours.

The catalyst is separated, washed with hexane and dried.
Composition per kg of catalyst:
1.9 g Ti
22 g Mg
70 g Cl B. Polymerization of Propylene Hexane (1 liter), 5 mmoles of triethyl aluminum (TEAL) and 0.5 mmoles of diphenyldimethoxysilane are added successively at 30° C. with stirring under a protective gas atmosphere to a 5 liter autoclave. After 5 minutes, 35 mg of catalyst are added.

Atomic ratios:
Al/Ti=200:1
Al/Si=10:1

After that, hydrogen, at a partial pressure of 0.05 bar, and 2 liters of liquid propylene are added.

The suspension is stirred for 15 minutes at a pressure of 2 bar and a temperature of 30° C. and subsequently heated to 70° C. At this temperature, the propylene pressure is adjusted to 7 bar.

Polymerization time: 2 hours

The polypropylene is isolated.

The catalytic activity, expressed in kg of polypropylene per g of titanium, is 476.

The productivity, expressed in g of polypropylene per g of catalyst, is 905.

Polypropylene properties:
specific density 244 g/liter
melt viscosity 6 g/10 min
(ASTM D Standard 1238)

Example 9

A. Preparation of the Catalyst

Solution 1

Dimethylsilyl-bis-(2-methyl-indenyl)dichlorozirconium (220 mg) is dissolved in 20 ml of a 10% by weight solution of methyl aluminoxane (MAO) in toluene.

Solution 2

Polypropylene beads (12.5 g), produced as in Example 2, are mixed with 42.5 g of an MAO solution (10% by weight of MAO in toluene).

Solutions 1 and 2 are mixed and the toluene is removed at 40 mbar and 38° C. over a period of 2 hours. A powdery catalyst with good flowability is obtained.

| Composition per kg of catalyst: | 1.7 g Zr |
| --- | --- |
|  | 86 g Al |

B. Polymerization of Propylene

The propylene is polymerized as in Example 7, the following conditions being modified.

The catalyst is added at 50° C. and the temperature is increased after 10 minutes to 70° C.

The polymerization time is 2 hours.

The partial pressure of the hydrogen is 0.1 bar.

DEAC is replaced by 1 mmole of TEAL.

The catalytic activity, expressed in kg of polypropylene per g of zirconium, is 1,000. The productivity, expressed in g of polypropylene per g of catalyst, is 1,700.

| Polypropylene properties: | specific density 311 g/liter |
| --- | --- |
|  | melt viscosity 65 g/10 min |
|  | (ASTM D Standard 1238) |

What is claimed is:

1. A method for producing porous polymer beads having a narrow particle size range ranging in diameter from 1 to 5,000 micrometers of a polymer selected from polypropylene, polyethylene and polyvinyl chloride, said method comprising the steps of:

a) dissolving the polymer in a solvent selected from the group consisting of halogenated aromatic hydrocarbons, alkyl esters and phenyl ethers, with which the polymer forms a true or colloidal solution, at temperatures of 100 to 180° C., b) cooling the solution, c) separating polymer beads which form upon cooling, d) removing the solvent, and e) drying the polymer beads.

2. The method for producing polymer beads of claim 1, wherein the solution is aged over a period of 0 to 24 hours with the temperature being lowered to 60 to 90° C.

3. The method for producing polymer beads of claim 1, wherein the solution is aged for 1 to 3 hours.

4. The method for producing polymer beads of claim 1, wherein the cooling is effected by adding the polymer solution to a cooling medium.

5. The method for producing polymer beads of claim 4, wherein the polymer solution is sprayed or atomized or dripped into the cooling medium.

6. The method for producing polymer beads of claim 4, wherein said cooling medium is air, $CO_2$ or $N_2$, in solid, liquid or gaseous form.

7. The method for producing polymer beads of claim 1, wherein the separated polymer beads are washed and subsequently dried.

8. The method for producing polymer beads of claim 7, wherein the polymer beads are washed with alcohol.

9. The method for producing polymer beads of claim 7, wherein the polymer beads are washed with isopropanol.

10. The method for producing polymer beads of claim 1, wherein at least one additive with functional groups, in dissolved or solid form, is admixed with the polymer solution in order to influence the physical and/or functional properties of the polymer beads.

11. The method for producing polymer beads of claim 10, wherein said at least one additive is selected from the group consisting of inorganic oxides, complexing agents, porosity-affecting agents and surfactants.

12. The method for producing polymer beads of claim 11, wherein said at least one additive is selected from the group consisting of $TiCl_4$, $TiCl_3$ and $MgCl_2$.

13. The method for producing polymer beads of claim 10, wherein said at least one additive comprises china clay.

* * * * *